(12) United States Patent
Palkar et al.

(10) Patent No.: US 12,332,875 B1
(45) Date of Patent: Jun. 17, 2025

(54) NESTED ARRAY BATCH PROCESSING

(71) Applicant: Databricks, Inc., San Francisco, CA (US)

(72) Inventors: Shoumik Palkar, Mountain View, CA (US); Alexander Behm, Lafayette, CA (US); David Cashman, Toronto (CA)

(73) Assignee: Databricks, Inc., San Francisco, CA (US)

( * ) Notice: Subject to any disclaimer, the term of this patent is extended or adjusted under 35 U.S.C. 154(b) by 346 days.

(21) Appl. No.: 17/884,099

(22) Filed: Aug. 9, 2022

Related U.S. Application Data

(60) Provisional application No. 63/388,105, filed on Jul. 11, 2022.

(51) Int. Cl.
*G06F 16/23* (2019.01)
*G06F 16/2453* (2019.01)
*G06F 16/2455* (2019.01)

(52) U.S. Cl.
CPC .... *G06F 16/2386* (2019.01); *G06F 16/24542* (2019.01); *G06F 16/24557* (2019.01)

(58) Field of Classification Search
CPC .............. G06F 16/2386; G06F 16/23; G06F 16/24542; G06F 16/24557
USPC .................................................. 707/713, 718
See application file for complete search history.

(56) References Cited

U.S. PATENT DOCUMENTS

| | | | |
|---|---|---|---|
| 6,505,269 B1* | 1/2003 | Potter | G06F 12/0284 |
| | | | 711/E12.013 |
| 7,519,577 B2* | 4/2009 | Brundage | G06F 16/83 |
| 11,269,889 B1* | 3/2022 | Aversano | G06F 16/2458 |
| 11,455,305 B1* | 9/2022 | Hwang | G06F 16/24549 |
| 2006/0224563 A1* | 10/2006 | Hanson | G06F 16/24542 |
| 2008/0177694 A1* | 7/2008 | Chaudhuri | G06F 16/24542 |
| 2009/0281992 A1* | 11/2009 | Bestgen | G06F 9/5027 |
| 2015/0169687 A1* | 6/2015 | Schechter | G06F 16/2428 |
| | | | 707/718 |
| 2021/0034598 A1* | 2/2021 | Arye | G06F 16/288 |
| 2021/0149904 A1* | 5/2021 | Behm | G06F 16/24545 |

\* cited by examiner

*Primary Examiner* — Shahid A Alam
(74) *Attorney, Agent, or Firm* — Fenwick & West LLP

(57) ABSTRACT

The present application discloses a method, system, and computer system for processing data. The method includes obtaining a query plan for processing input data in response to a query, obtaining the input data, selecting a batch of the input data, creating a metadata structure for the batch, allocating one or more contiguous parts of a memory for processing the batch, processing the batch in accordance with the metadata structure to generate resulting data, and storing each array of the resulting data for the batch in one of the one or more contiguous parts of the memory.

18 Claims, 8 Drawing Sheets

300

400

… (1)

NESTED ARRAY BATCH PROCESSING

CROSS REFERENCE TO OTHER APPLICATIONS

This application claims priority to U.S. Provisional Patent Application No. 63/388,105 entitled NESTED ARRAY BATCH PROCESSING filed Jul. 11, 2022 which is incorporated herein by reference for all purposes.

BACKGROUND OF THE INVENTION

A system for big data processing comprises a system for deployments of applications, configurations, one or more datasets, and model(s) used in connection with analyzing the data. Systems for big data processing generally receive queries, develop a query plan, and implement the query plan in connection with evaluating data in the one or more datasets to obtain data responsive for data. In some cases, processing of nested arrays in big data processing as designated in the query plan execution is handled sequentially by row and, in these situations, this sequential processing leads to inefficient memory accessing for nested arrays and thus slow processing for the query.

BRIEF DESCRIPTION OF THE DRAWINGS

Various embodiments of the invention are disclosed in the following detailed description and the accompanying drawings.

DETAILED DESCRIPTION

Figure 1:
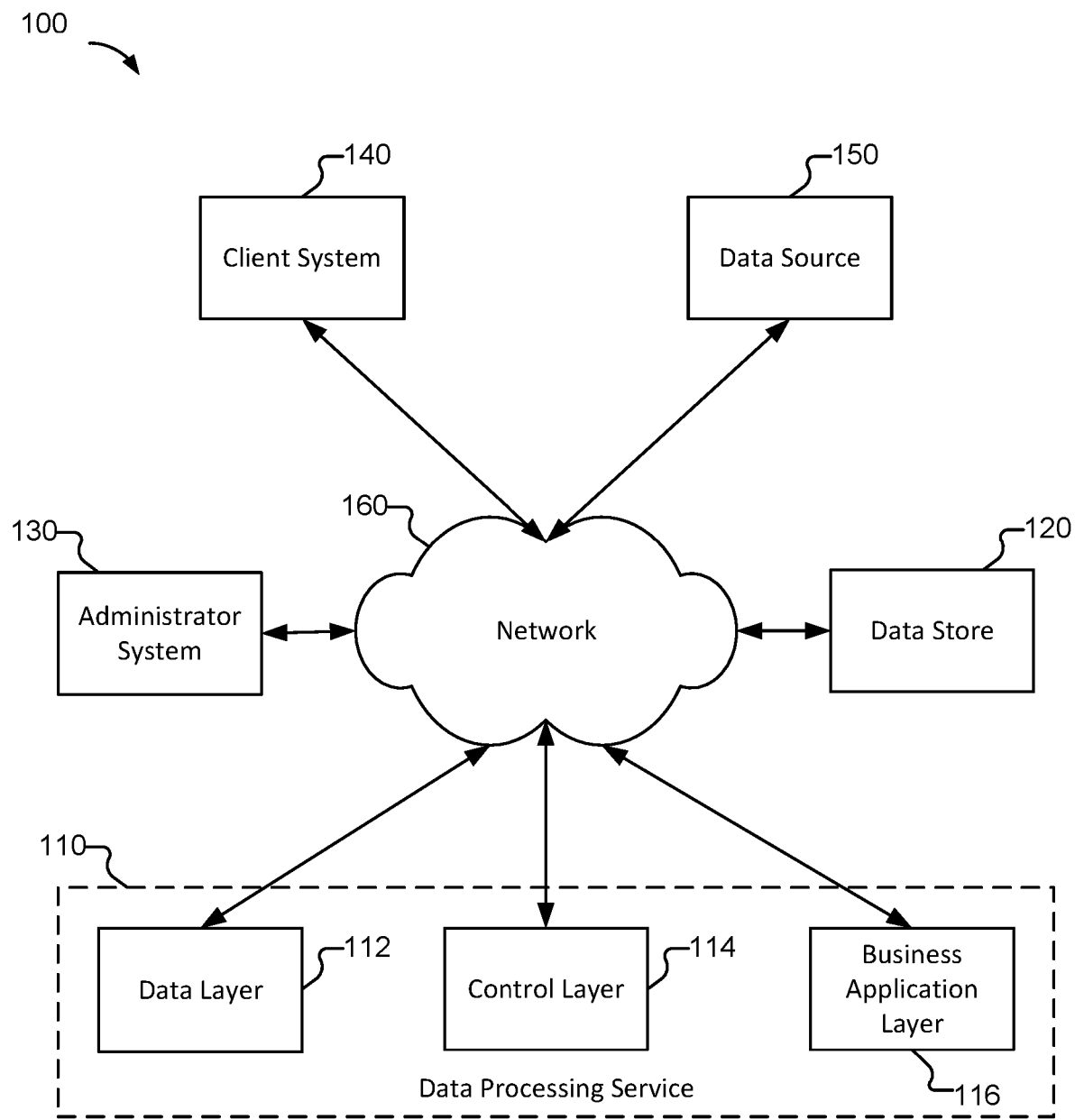
FIG. 1 is a block diagram of a system for processing data according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In response to receiving a query, related art systems determine a query plan for processing the query, including determining information in one or more datasets that are to be evaluated/processed in connection with determining a response to the query. The one or more datasets can include one or more tables. In response to determining that data to be evaluated in connection with performing a query includes a table, the system reads the table on a row-by-row basis. The rows in the table are sequentially read and evaluated to determine responsive data. Whenever related art systems access a new row to evaluate the row data, related art systems are generally required to access the location in memory at which the row data is stored. Such accessing of the row data at the different locations in memory during sequential evaluation of the rows can cause related art systems to make non-sequential access to the memory (e.g., to jump around the memory to various locations corresponding to row data). In some embodiments, this jumping around especially occurs when nested arrays are in the row data. Such jumping to different locations in the memory is a problem and can lead to suboptimal evaluation of the query. In addition, such jumping or nonadjacent storage of data subject to the query can lead to greater overhead in the allocation of memory or to determining a size of memory required for allocating to the data. These problems lead to slower performance in terms of the processing of the query.

Various embodiments include a system, method, and device for processing input data, such as to arrange the input data in connection with facilitating an efficient and/or effective reading of such input data. The method includes obtaining a query plan for processing input data in response to a query, obtaining the input data, selecting a batch of the input data, creating a metadata structure for the batch, allocating one or more contiguous parts of a memory for processing the batch, processing the batch in accordance with the metadata structure to generate resulting data, and storing each array of the resulting data for the batch in one of the one or more contiguous parts of the memory.

According to various embodiments, in response to determining that data to be evaluated in connection with processing a query is a table, the system sequentially reads the table (or a chunk of a table, such as in batches), and stores the rows in a contiguous part of the memory. After the system stores the row data in sequential subsets of the contiguous part of the memory, the system walks the contiguous part of the memory as the system evaluates the query. Walking the contiguous part of the memory enables the system to more efficiently access row data. In some embodiments, if a column of the table corresponds to an array data type, then the system can store the elements in an array for a row sequentially in a contiguous subset of the contiguous party of the memory in which the system stores the table data (or batch data).

Various embodiments include a vectorized query engine that reads into memory input data subject to a query. The vectorized query engine can be implemented by a system, device, a service, etc. The vectorized query engine determines a metadata structure that facilitates an efficient reading of the input data into memory for evaluation of the query. In some embodiments, the vectorized query engine reads the input data into memory in accordance with a metadata structure that causes the input data to be read into contiguous parts of a memory allocated for the input data to be processed for a query. For example, the system can recursively store data for row data (or elements in an array in the row data) in contiguous subsets of the contiguous part of the memory.

According to various embodiments, the system determines a manner by which the system can walk through memory access during evaluation of a query. For example, the system can determine a best path for walking through the memory access, and the best path can correspond to laying out row data for a row in a table and/or table data or batch data (e.g., table data that includes row data for a plurality of rows in contiguous parts of the memory.

Performing queries on datasets can be very resource intensive. At scale, the number of rows in a table comprised in the dataset on which the query is performed becomes extremely large, such as on the order of at least tens or hundreds of thousands of rows. Performing a query on an extremely large number of rows can be inefficient. Accordingly, the system can process the query on chunks of input data from the dataset (e.g., input data on which the query is evaluated). The chunks of input data can correspond to batches of a table in the dataset. In some embodiments, the system determines a set of batches of a table on which the query is to be evaluated. The set of batches can be determined based at least in part on a predetermined batching policy. Examples of batching policies can include a maximum number of rows for a batch, a minimum number of rows for a batch, a maximum file size of a batch, a minimum file size of a batch, etc. Various other batching policies can be applied. In some embodiments, a maximum number of rows for a batch is 4096 rows.

According to various embodiments, in response to determining a set of batches of data (e.g., input data) to be processed/evaluated for a query, the system selects a batch for which the input data is to be read into memory. The system can process the batch to store row data of the batch into a contiguous part of the memory allocated for the batch and/or for performing the query. In some embodiments, the system iteratively processes the batches to read the corresponding data into contiguous parts of the memory. The contiguous parts of a memory respectively corresponding to a plurality of batches can be contiguous with one another, such as to form a contiguous superset of the memory. The system can evaluate the query for data in the batch in response to storing the data in the corresponding contiguous part of the memory, or the system can evaluate the query for data across a plurality of batches after the plurality of batches (e.g., all batches in the set of batches) have been processed to store the data in corresponding contiguous parts of the memory.

In some embodiments, the system determines whether evaluation of a query involves processing an array of data (e.g., an array of data nested in a row), and in response to determining that an array is to be processed, the system determines an efficient manner for reading/storing the corresponding data. For example, in response to determining that a column of the batch corresponds to an array data type, the system implements a method for reading data of the batch into an allocated contiguous part of the memory. The system can determine whether evaluation of a query involves processing an array of data based at least in part on a query plan such as a query plan that the system obtains (e.g., determines) in response to receiving the query. In some embodiments, the system sequentially lays out (e.g., stores) data of a batch in contiguous parts of the memory. For example, the system can sequentially store data for the elements in an array of the batch (e.g., an array in a row of the batch) in a contiguous part of the memory allocated for processing the batch.

In response to determining that input data (e.g., data for a batch) is to be read into memory for evaluation in connection with performing a query, the system determines a metadata structure according to which the batch is to be processed to store the data in memory (e.g., a contiguous part of the memory allocated to the batch). The metadata structure can indicate a location in the contiguous part of the memory at which the data for various rows in the batch are stored. In some embodiments, the metadata structure is configured such that the data for the sequential rows in the batch are contiguous with one another. In some embodiments, the metadata structure is further configured such that the data for elements of an array comprised in a row (e.g., a child array) are contiguous with one another, and the data for sequential rows (e.g., which can respectively comprise child arrays) are stored contiguous with one another in the contiguous part of the memory allocated to the batch. In some embodiments, the metadata structure for integer data types can correspond to <offset, length>, where the offset corresponds to a location of the contiguous part of memory at which a first part of the data for a row is stored, and length corresponds to a length of the segment of the contiguous part of memory (e.g., extending from the offset) over which the data spans. In some embodiments, the metadata structure for an array data type can correspond to <child_idx, offset, length>, wherein child_idx corresponds to an identifier for the child array (or an index for the child array), the offset corresponds to a location of the applicable contiguous part of memory (e.g., a subset of the contiguous memory) at which a first part of the data for an array in a row of the batch is stored, and length corresponds to a length of the segment of the contiguous part of memory (e.g., extending from the offset) over which the data for the array spans. In some embodiments, the data for each child array is stored (e.g., sequentially) in a contiguous part of the memory (e.g., a subset of the contiguous part of the memory allocated to the batch). The subsets of the contiguous part of the memory in which data for respective rows of the batch (e.g., respective child arrays) can be contiguous with one another or disjointed/distant (e.g., nonadjacent) with one another. Processing of the rows for a batch to store the corresponding data in the contiguous part of the memory includes performing a transformation of a structure according to which data of the batch is arranged/stored (e.g., the initial structure of the data of the batch) to obtain the metadata structure according to which row data in the batch is to be stored contiguously.

In some embodiments, the system allocates a contiguous part of the memory for processing a batch such as storing the data for the batch. The system can determine a size of the contiguous part of the memory based at least in part on a size of the batch data or of the input data to be evaluated. For example, the system can estimate memory requirements (e.g., a size of data of the batch) for the batch. The system can use the query plan in connection with determining the memory requirements for the batch. In some embodiments, the system determines the memory requirements based on the batching policy according to which the set of batches (e.g., comprising the batch for which memory is to be allocated) is determined. For example, the system can determine a size of the contiguous part of memory to be allocated to a batch based at least in part on a maximum batch size (e.g., a maximum file size, a maximum number of rows in the batch, etc.). The system can determine whether row data comprises a child array(s) and use such a determination in connection with determining a size of the contiguous part of the memory to be allocated to a batch. Allocating a contiguous part of the memory for a batch (or for a set of batches) can lead to more efficient memory allocation (e.g., compute resources to determine an allocation) and to a more efficient manner for releasing the memory after the data is no longer to be stored or needed (e.g., after the query has been evaluated).

In response to determining the memory structure and then selecting the batch to be processed (e.g., from among the set of batches for input data, or data that is responsive to the query), the system can process the batch. In some embodiments, the system processes the batch in accordance with the metadata structure. For example, the system reads the batch data and stores such data in a contiguous part of the memory. Data for rows in the batch are read and stored sequentially in the contiguous part of the memory. As another example, the batch data is stored in a contiguous part of the memory and metadata (e.g., structured according to the metadata structure) is configured to store locations of parts of the batch data corresponding to data to be evaluated. For example, the metadata is configured to include pointers to parts of the contiguous part of the memory in which a particular row data can be obtained.

According to various embodiments, in response to determining that the input data (or subset of the input data, such as data for a batch) has been processed and read into a contiguous part of the memory according to the metadata structure, the system evaluates an expression with respect to resulting data (e.g., data stored in the contiguous part of the memory). The system can evaluate the resulting data based on the query plan. As an example, the system implements the processing for the query based on the resulting data stored in the contiguous part of the memory to obtain evaluated data (e.g., evaluated data) from the resulting data.

In some embodiments, after evaluating the resulting data in the contiguous part of the memory based at least in part on the query, the system transforms the evaluated data based at least in part on the metadata structure. The system can walk through the metadata structure (e.g., walk the contiguous part of the memory) and place the evaluated data back in the original format for the input data (or batch). The system can determine the transformation to perform with respect to the evaluated data stored in the contiguous part of the memory based at least in part on the metadata structure, such as based on a transformation that was performed with respect to the input data to obtain the metadata structure.

Various embodiments improve on the efficiency of performing queries with respect to input data. In contrast to related systems that jump around in the memory to obtain the corresponding data to be processed for the query, systems according to various embodiments lay out (e.g., store) the data to be processed in a contiguous part of the memory to facilitate a more efficient manner for accessing the data. For complex evaluations (e.g., queries), the processing of the data stored in a manner according to various embodiments can be on the order of five times faster than processing queries on data stored in its original state or otherwise in accordance with related art methods. Various embodiments also improve on the management of memory. For example, in some embodiments, a single contiguous part of the memory is allocated to a batch and in response to the batch being evaluated or otherwise no longer needed with respect to performing the query, the system can efficiently release the contiguous part of the memory. The system can use a single operation to release a single contiguous part of the memory versus several operations for related art systems to release the various parts of the memory corresponding to a batch data that is stored in various nonadjacent locations of the memory. For example, in some embodiments, the system does not need to manage memory for each small array being processed. Instead, the system can manage a single contiguous part of the memory for evaluating the batch data.

In some embodiments, a batch comprises one or more rows, where each row has one or more columns. In some embodiments, each column is stored contiguously and separately (in columnar format). For example, a row <int, long, string> stores three vectors (one int, one long, one string), where the values at position X (e.g., as indicated by a position in a memory for the column as stored in the memory) correspond to the row X.

In some embodiments, for arrays, metadata is stored about the array and the array elements, including the array's length and the array's location in memory (e.g., as an offset into a memory buffer). In various embodiments, the metadata is stored in an index or in an array column location or any other appropriate location. For example, for an array of integers [1, 2, 3], an array length is stored as metadata and then the three array elements. In some embodiments, a pointer or some other information about where to find the array elements is stored as metadata for the array. In various embodiments, the pointer or other location information metadata is stored in an index or in an array column location or any other appropriate location.

In various embodiments, for a column of arrays, each array is represented either as <offset, length> or <child index, offset, length> or any other appropriate format.

In some embodiments, for a column of arrays, there are one or more child columns that hold the array elements, where each child column comprises a contiguous region of memory that holds array elements. In some embodiments, the elements within a single array are contiguous, but the elements for two contiguous rows are not contiguous. For example, row N's array elements may not be adjacent to row (N+1)'s array elements.

In some embodiments, the child index indicates a child column in which an array's data is contained. In some embodiments, the offset indicates an offset within a child column at which the array data starts.

In some embodiments, the length indicates how many contiguous elements (starting at the offset) are part of the array.

In some embodiments, in response to there being no child index, the child index is presumed to be 0—for example, the elements are in the first child column.

In some embodiments, in response to a column of arrays having only one child column, all arrays within the column of arrays will have child indices of 0. This means that all arrays are stored within a single contiguous block of memory. In some embodiments, in response to there being two child columns, there are two contiguous blocks of memory, and the array has either child index 0 or 1. In some embodiments, in response to there being N child columns, there are N contiguous blocks of memory and the array has child index 0, 1, . . . N-1.

In some embodiments, in response to there being an arbitrary number of child columns (e.g., X child columns), to look up an array element at index Y at row Z the following expression is used: ChildColumns [ArrayColumn[Z]. ChildIndex][ArrayColumn[Z]. Offset+Y]. That is the child column to access is first looked up and then the correct position within that child column is accessed.

In some embodiments, in response to there being one child, to look up an array element at index Y at row Z the following expression is used:

ChildColumns [0][ArrayColumn[Z].Offset+Y], which is more efficient as there is only one lookup.

In some embodiments, having one child column is an efficient solution as a single loop with a single array access is used to process array elements. In some embodiments, having multiple child columns is useful in the event that it is desired to create a new array column. For example, a new array column (e.g., column Out) is desired to be created from two existing columns (e.g., column In1 and column In2)—as an example, even-indexed rows from column In1 and odd-indexed rows from column In2 are desired in column Out. In the case where only a single child column was allowed, a new child column would need to be created for column Out; all array elements desired from column In1 would need to be copied to column Out (e.g., all even-indexed rows from column In1); all array elements desired from column In2 would need to be copied to column Out (e.g., all odd-indexed rows from column In2); and all offsets for each array in Out need to be determined (e.g., one offset for each row position from each even-indexed row of column In1 and one offset for each row position from each odd-indexed row of column In2). However, in the case where two (or more) child columns are allowed, the child column from column In1 can be referenced in column Out; the child column from column In2 can be referenced in Out; and the child indices for the arrays in column Out can be updated (e.g., to point to the even-indexed rows and the odd-indexed rows).

FIG. 1 is a block diagram of a system for processing data according to various embodiments of the present application. According to various embodiments, system 100 implements at least part of process 500 of FIG. 5, process 600 of FIG. 6, process 700 of FIG. 7, and/or process 800 of Figure. System 100 can implement mapping 300 of FIG. 3 and/or mapping 400 of FIG. 4.

In the example illustrated in FIG. 1, system 100 includes data processing service 110, data store 120, administrator system 130, client system 140, and/or data source 150. In some embodiments, data processing service 110 and/or data source 150 are integrated (e.g., combined into a layer or a single set of server(s)). System 100 further includes one or more networks such as network 160 over which administrator system 130 and/or client system 140 communicates with data processing service 110, data store 120, and/or data source 150. In various embodiments, network 160 includes one or more of a wired network, and/or a wireless network such as a cellular network, a wireless local area network (WLAN), or any other appropriate network. System 100 may include various other systems or devices.

In some embodiments, data processing service 110 comprises data layer 112, control layer 114, and business application layer 116. Data layer 112, control layer 114, and/or business application layer 116 can be respectively implemented by one or more servers. In some implementations, data layer 112, control layer 114, and/or business application layer 116 are implemented by a same set of one or more servers. In some embodiments, system 100 comprises a plurality of data layers that respectively process data pertaining to various tenants or customers. For example, each data layer can be implemented for a different tenant or customer.

According to various embodiments, data processing service 110 processes data with respect to one or more datasets. For example, data processing service 110 can manage data stored in one or more datasets (e.g., on data store 120) and/or use the one or more datasets in connection with evaluating a query. Data processing service 110 can receive requests to store or obtain data for one or more datasets from client system 140 and/or data source 150. In some embodiments, data processing service 110 receives a query from a client system or other system or service (or a query plan that was determined by another system or service for a received query). Client system 140 and/or data source 150 can be connected to data processing service 110 via a connector, such as an application programming interface (API). In some embodiments, data processing service 110 provides data (or access to data such as via a link) in response to data requests. For example, the data requests can be communicated to data processing service 110 by client system 140, or a data requesting service, such as a third-party service. Examples of the data requesting service include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other data consuming clients.

According to various embodiments, data processing service 110 retrieves data stored in one or more datasets of data store 120 or data being ingested from data source 150, and data processing service 110 processes the data to store the data in a contiguous part of a memory such as to facilitate an efficient manner for system 100 to walk through the data to perform a query (e.g., to evaluate the data in accordance with the query). In response to obtaining a query plan (e.g., in response to receiving a query), data processing service 110 (e.g., data layer 112) can allocate memory (e.g., memory managed by data layer 112) for input data, or portion of input data such as a batch of data, that is to be processed (e.g., evaluated) for the query plan. As an example, if the input data is relatively large (e.g., larger than a predetermined size threshold or maximum number of row threshold), data processing service 110 determines a set of batches corresponding to the input data. In some embodiments, the memory allocated for a batch (e.g., each batch of the set of batches) is a contiguous part of memory. For example, in response to determining input data or batch data to be processed, data processing service 110 can determine an amount of memory (e.g., a size of the contiguous part of the memory) to be allocated for processing the input data or batch data.

According to various embodiments, in response to determining the allocation of the contiguous part of memory for processing the batch data, data processing service 110 (e.g., data layer 112) obtains the batch data from one or more datasets (e.g., a dataset stored in data store 120) and stores the corresponding data (e.g., as resulting data) in the contiguous part of the memory allocated to the batch. Data layer 112 can retrieve the batch data from the data store 120 or data source 150 and lay out the batch data in the contiguous part of the memory allocated to the batch, such as in accordance with a metadata structure (e.g., a metadata structure used to evaluate the batch data). In some embodiments, the contiguous part of the memory allocated to the batch is comprised in (or otherwise managed by) data layer 112 such as in a local cache for data layer 112.

In response to storing the batch data in the one or more contiguous parts of the memory in accordance with the metadata structure, the resulting data can be evaluated in accordance with the query. In some embodiments, data layer 112 evaluates the resulting data based on a query plan generated in response to receiving the query. Evaluating the resulting data can include processing the resulting data to determine responsive data that is responsive to the query.

In some embodiments, in response to evaluating the resulting data (e.g., to obtain evaluated data that is responsive to the query), data layer 112 provides the evaluated data (or a location of such to such data) to control layer 114 and data processing service 110 (e.g., control layer 114) can provide an indication to the client system, other service, or other system from which the query was received. In some embodiments, data processing service 110 uses business application layer 116 to provide the data responsive to the query, such as by configuring a user interface, a report, etc. Before providing the data responsive to the query, data processing service 110 can process the evaluated data, such as to transform the evaluated data from a structure corresponding to the metadata structure to a structure corresponding to the input data (e.g., batch data). In some embodiments, data layer 112 determines a transformation to be performed on the evaluated data and performs the transformation. As an example, the transformation to be performed on the evaluated data can be determined based at least in part on one or more of the metadata structure (e.g., the metadata structure according to which the batch data is processed and stored) and the structure according to an original format of the input data. Data layer 112 can store the transformed evaluated data (e.g., the query responsive data) in data store 120. The transformed evaluated data can be used to provide a response to the query.

Data processing service 110 can expose the resulting data (e.g., the data stored in a contiguous part of the memory in accordance with a metadata structure), the evaluated data (e.g., the processed resulting data), or transformed evaluated data for consumption by services or other systems such as client system 140 or a service running on control layer 114 or business application layer 116. For example, the lineage data is exposed to the client system 140 or other service via an API.

In some embodiments, data processing service 110 uses data layer 112 to process a batch (e.g., batch data) and store resulting data in a contiguous part of a memory in accordance with a metadata structure (e.g., a metadata structure that facilitates efficient reading or processing of the resulting data to evaluate a query). Data layer 112 receives a query (or corresponding query plan) with respect to data stored in a dataset such as a dataset associated with the tenant or customer for which data layer 112 is deployed. In some embodiments, data layer 112 includes one or more clusters of compute resources such as virtual machines (e.g., a cluster of virtual machines). As an example, the cluster of virtual machines includes one or more compute resources such as worker nodes, etc. The cluster can use the worker node(s) to process various jobs in connection with providing a service, such as processing jobs or queries with respect to one or more datasets or batch data laid out in a contiguous part of a memory.

Data processing service 110 can determine to process input data in chunks such as based on a determination that the input data exceeds a size threshold. In response to determining to process the input data in chunks, data processing service 110 (e.g., data layer 112) determines a set of batches corresponding to the input data. As an example, data processing service 110 determines the set of batches based at least in part on a predefined batching policy. In response to determining the set of batches, data processing service 110 uses data layer 112 to process batch data (e.g., to store the batch data in a contiguous part of memory in accordance with a metadata structure).

Data processing service 110 obtains (e.g., determines) memory allocations for the set of batches. In some embodiments, data processing service 110 uses data layer 112 to allocate a contiguous part of the memory to a batch. For example, contiguous parts of the memory can be respectively allocated to the batches (e.g., each batch) in the set of batches. The contiguous parts of the memory respectively allocated to the batches can be contiguous with one another (e.g., sequential batches are allocated contiguous parts of the memory that are contiguous with each other). The memory allocations for the set of batches are respectively determined based at least in part on a size of a batch (e.g., an applicable file size, a number of rows, a number of data elements, etc.) or an expected size of the batch.

In some embodiments, data layer 112 evaluates a query with respect to batch data stored in a contiguous part of the memory by traversing the contiguous part of the memory and evaluating each sequential data element based on the query plan.

In some embodiments, data processing service 110 uses control layer 114 to respond to queries with respect to a particular dataset. As an example, client system 140 uses an API to connect to data processing service 110 and request a query that is to be evaluated on one or more datasets. Control layer 114 receives the query from the API (or via business application layer 116), requests data layer 112 to evaluate the query with respect to the one or more datasets, receives query responsive data (e.g., transformed evaluated data) or a location for such data from data layer 112, and provides a response to the query.

In some embodiments, control layer 114 enforces permissions with respect to datasets (or parts of datasets) and in connection with providing responses to queries. For example, in response to receiving a query, control layer 114 determines whether the user, system, or other process from which the query is received has permission to view the one or more data entities corresponding to the data that is responsive to the query. Control layer 114 can use a credential associated with the user, system, or process to determine whether such user, system, or process has the requisite permissions. In response to determining that the user, system, or other process has requisite permissions for the one or more data entities responsive to the query, control layer 114 can expose such responsive data in response to the query. If control layer 114 determines that the user, system, or process has permissions for only a subset of all data responsive to the query, control layer 114 exposes only the subset of data entities for which the user, system, or process has requisite permissions. Control layer 114 can hide, or otherwise block access to, data entities that are responsive to the query but for which the user, system, or process does not have adequate permissions. Control layer 114 can check the permissions for a user, system, or process by querying a mapping of credentials to permitted data entities, permitted groups of data entities, or permitted types of data entities, etc.

According to various embodiments, system 100 comprises data store 120. System 100 uses data store 120 to store one or more datasets comprising data entities and/or transformed evaluated data (e.g., processed batch data that is evaluated based on the query and transformed to an initial structure or format of the dataset). Data store 120 can store datasets for a plurality of tenants or customers serviced by data processing service 110.

According to various embodiments, system 100 comprises administrator system 130 for use by an administrator such as an administrator of data processing service 110 or an administrator of a user associated with data store 120 and/or an instance of data processing service 110. For example, administrator system 130 comprises a system for communication, data access, computation, etc. An administrator uses administrator system 130 to maintain a dataset stored in data store 120, to define and manage applications provided by system 100, to set data management policies, to set batching policies, to configure metadata structures to be used in connection with reading out batch data, to provide various system configurations or settings, etc. For example, an administrator uses administrator system 130 to define one or more security policies that are to be enforced (e.g., by data processing service 110, data layer 112, and/or control layer 114) with respect to a data stored at data store 120 (e.g., data entities, lineage data for data entities, etc.). In some embodiments, administrator system 130 communicates with data processing service 110 via a web-interface (e.g., by using a web browser, etc.). For example, administrator system 130 communicates with data processing service 110 via a web-browser installed on administrator system 130 (e.g., via a user interface configured by an application running on data processing service 110). In some embodiments, administrator system 130 communicates with data processing service 110 via an application or service running on administrator system 130 (e.g., a connector or API corresponding to data processing service 110).

According to various embodiments, data processing service 110 comprises business application layer 116. Data processing service 110 uses business application layer 116 to provide an interface via which a user (e.g., using administrator system 130, client system 140, etc.) may interact with various applications such as a development application for developing a feature or model for analyzing the data stored in the data store 120, an application for querying a dataset stored in data store 120, an application to access files stored in a dataset (e.g., a dataset stored in data store 120), an application to perform dataset cleanup such as compaction operations, etc. Various other applications can be provided by business application layer 116. For example, a user queries data layer 112 by sending a query/request to business application layer 116, which interfaces with data layer 112 and/or control layer 114 to obtain information responsive to the query (e.g., business application layer 116 formats the query according to the applicable syntax and sends the formatted query to data layer 112 such as via control layer 114). As another example, an administrator uses an interface provided/configured by business application layer 116 to configure (e.g., define) one or more security policies, including configuring access permissions to files, one or more data management policies and/or one or more batching policies.

According to various embodiments, system 100 comprises client system 140. Client system 140 is used by a user such as a user corresponding to a data recipient (e.g., a developer such as a developer of code, a developer of a model, a user of an organization associated with a one or more datasets stored at data store 120, etc.) to communicate with data processing service 110 (e.g., a business application layer 116.) and/or data stored in data store 120. As an example, client system 140 communicates with data processing service 110 via a web-interface. In some embodiments, client system 140 communicates with data processing service 110 via an application or service running on client system 140 (e.g., a module such as a connector or API that interfaces with data processing service 110). In some embodiments, a user uses client system 140 to develop code on a business application layer, which makes a call to with respect to data exposed via data processing service 110, or to invoke a task to be performed with respect to certain data stored in data store 120 (e.g., to update a data entity, to recompute a data entity, etc.), to modify code at a business application (e.g., to execute code against data stored in data store 120), to query data store 120 or a data share corresponding to a subset of data (e.g., data objects) within data store 120 (e.g., in connection with discovering code, a library, a module, etc.), etc.

According to various embodiments, system 100 comprises data source 150. Data source 150 can provide data to be processed by data processing service 110 and stored in datasets on data store 120. For example, data processing service 110 can ingest data provided by data source 150.

Figure 2:
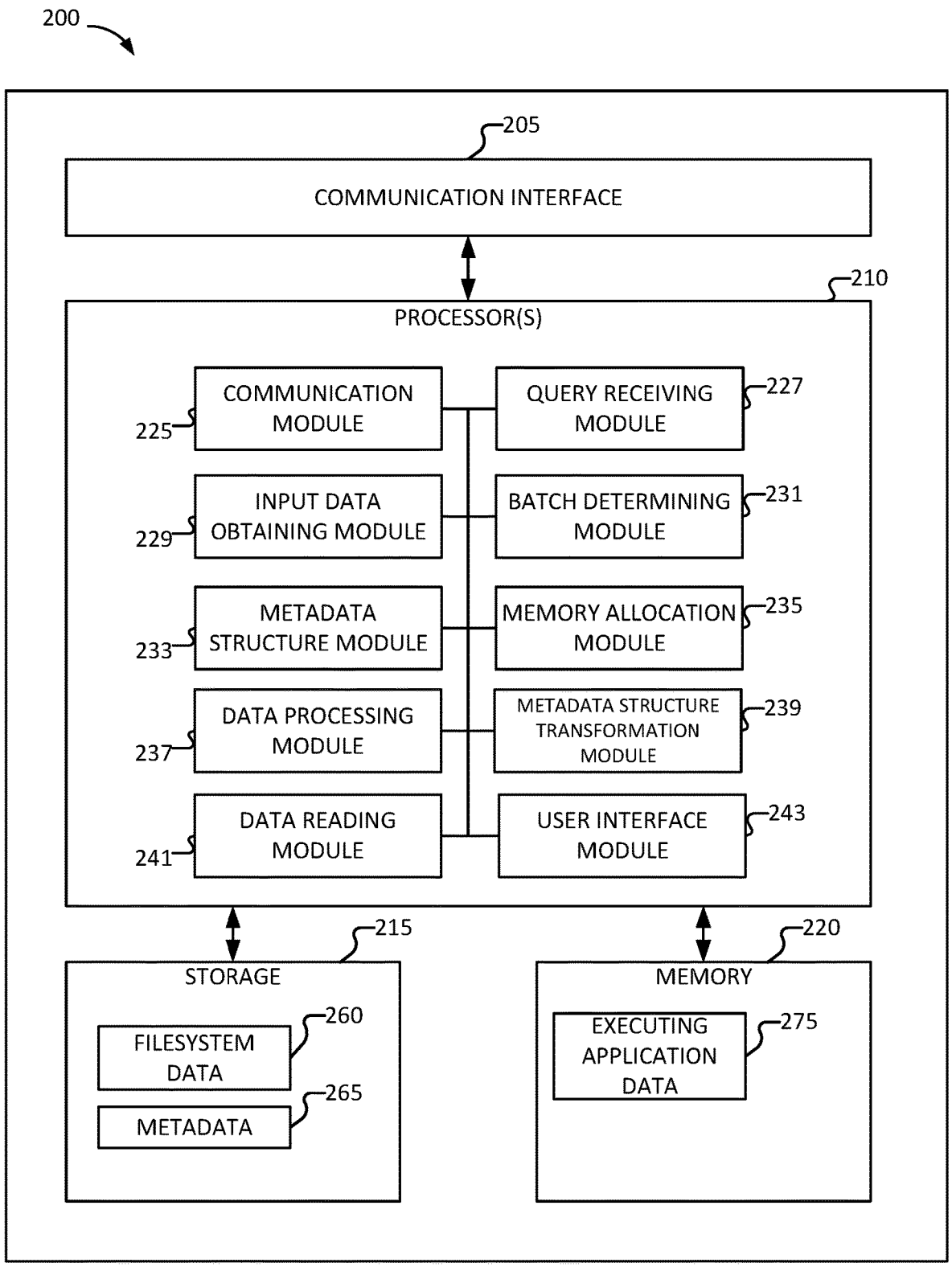
FIG. 2 is a block diagram of a data processing system according to various embodiments of the present application.

FIG. 2 is a block diagram of a data processing system according to various embodiments of the present application. According to various embodiments, system 200 implements at least part of system 100 of FIG. 1 (e.g., data processing service 110), process 500 of FIG. 5, process 600 of FIG. 6, process 700 of FIG. 7, and/or process 800 of FIG. 8.

In the example shown, system 200 implements one or more modules in connection with managing data, processing (e.g., evaluating queries), mediating access by data recipients with respect to the datasets, etc. System 200 comprises communication interface 205, one or more processors 210, storage 215, and/or memory 220. One or more processors 210 comprises, or implements, one or more of communication module 225, query receiving module 227, query receiving module 227, input data obtaining module, batch determining module 231, metadata structure module 233, memory allocation module 235, data processing module 237, metadata structure transformation module 239, data reading module 241, and/or user interface module 243.

In some embodiments, system 200 comprises communication module 225. System 200 uses communication module 225 to communicate with various other systems such as a user system, an administrator system, and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request a request to configure a data processing service, a data management policy, a security policy, an access policy, a batching policy, a storage system configuration such as a configuration for a partitioning of data, a query, a query plan for a query, etc. The user input to the user system can include the creation of a new file, a modification or update to a file, a query for a file (e.g., a csv file, a library, a module, etc.), a query for a data entity, a request to set one or more security policies (e.g., a permission with respect to accessing a file or a directory), a request to set one or more data management policies, a request to set one or more data access permissions, etc. Communication module 225 is configured to provide various user systems or data requesting services with information such as user interface (e.g., an interface corresponding to a workspace or notebook), information that is responsive to one or more queries or tasks requested to be executed, locations at which data is to be accessed, credentials for accessing data, URLs corresponding to locations at which data responsive to data access requests can be retrieved, etc. In some embodiments, communication module 225 communicates data responsive to data requests (e.g., queries to a dataset, etc.).

In some embodiments, system 200 comprises query receiving module 227. System 200 uses query receiving module 227 to obtain a query and to parse the query. Query receiving module 227 can obtain the query based on a user input (e.g., a user query) or in connection with system 200 processing (e.g., executing) a job, such as a job to be invoked by a process running on system 200. Query receiving module 227 can parse the query contemporaneous with receipt of the query by system 200. For example, the query is parsed in real-time upon receipt of the query. In some embodiments, query receiving module 227 obtains a query plan associated with evaluating a query. For example, query receiving module 227 deconstructs a received query to determine a query plan, such as a set of operations to be performed to determine responsive data. As another example, query receiving module receives the query plan from another entity that received the query (e.g., another system, another service, etc.).

In some embodiments, system 200 comprises input data obtaining module 229. System 200 uses input data obtaining module 229 to obtain input data that is to be used in connection with implementing a query (e.g., evaluating the query). Obtaining the input data can include determining a dataset(s) invoked by the query and/or a location of such dataset. System 200 can further use input data obtaining module to retrieve batch data in connection with processing the batch data to determined resulting data that is stored in accordance with a metadata structure that provides an efficient manner for reading/evaluating the resulting data.

In some embodiments, system 200 comprises batch determining module 231. System 200 uses batch determining module 231 to determine one or more batches that are to be processed in connection with evaluating a query. The one or more batches can respectively correspond to chunks of the input data. The set of batches can be determined based at least in part on a predetermined batching policy. Examples of batching policies can include a maximum number of rows for a batch, a minimum number of rows for a batch, a maximum file size of a batch, a minimum file size of a batch, etc. Various other batching policies can be applied. In some embodiments, a maximum number of rows for a batch is 4096 rows. In some embodiments, batch determining module 231 determines to batch the input data based at least in part on a determination that a size of the input data exceeds a size threshold (e.g., that a number of rows of the table of the input data exceeds a threshold pertaining to a number of rows, such as a maximum row threshold, etc.). Batch determining module 231 can be further used to select, from among the set of batches corresponding to the input data, a batch to be processed in connection with evaluating a query.

System 200 selects a batch for which the input data is to be read into memory. System 200 can process the batch to store row data of the batch into a contiguous part of the memory allocated for the batch and/or for performing the query. In some embodiments, system 200 iteratively processes the batches to read the corresponding data into contiguous parts of the memory. The contiguous parts of a memory respectively corresponding to a plurality of batches can be contiguous with one another, such as to form a contiguous superset of the memory. System 200 can evaluate the query for data in the batch in response to storing the data in the corresponding contiguous part of the memory, or system 200 can evaluate the query for data across a plurality of batches after the plurality of batches (e.g., all batches in the set of batches) have been processed to store the data in corresponding contiguous parts of the memory.

In some embodiments, system 200 comprises metadata structure module 233. System 200 uses metadata structure module 233 to determine a particular metadata structure according to which the input data (or the batch data for the selected batch) is to be read from storage and written into memory for evaluation of the query. The particular metadata structure can be selected from a plurality of predefined metadata structures. In some embodiments, metadata structure module 233 determines the particular metadata structure based on a data type of one or more columns/rows of the batch data that is to be processed. In various embodiments, the metadata structure for integers, strings, structs, maps, floats, decimals, array types, or any other appropriate data type is a structure that enables an efficient manner for reading/storing the corresponding data.

In some embodiments, system 200 (e.g., metadata structure module 233) determines whether evaluation of a query involves processing an array of data and in response to determining that an array is to be processed, system 200 (e.g., metadata structure module 233) determines an efficient manner for reading/storing the corresponding data. For example, in response to determining that a column of the batch corresponds to an array data type, system 200 implements a method for reading data of the batch into an allocated contiguous part of the memory. System 200 can implement the method for reading the batch data based on a metadata structure for storing the data in an allocated one or more contiguous parts of the memory. The system can determine whether evaluation of a query involves processing an array of data based at least in part on a query plan such as a query plan that query receiving module 227 obtains (e.g., determines) in response to receiving the query.

In response to determining that input data (e.g., data for a batch) is to be read into memory for evaluation in connection with performing a query, metadata structure module 233 determines a metadata structure according to which the batch is to be processed to store the data in memory (e.g., a contiguous part of the memory allocated to the batch). The metadata structure can indicate a location in the contiguous part of the memory at which the data for various rows in the batch are stored. In some embodiments, metadata structure module 233 configures the metadata structure such that the data for the sequential rows in the batch are contiguous with one another. In some embodiments, metadata structure module 233 configures the metadata structure such that the data for elements of an array comprised in a row (e.g., a child array) are contiguous with one another, and the data for sequential rows (e.g., which can respectively comprise child arrays) are stored contiguous with one another in the contiguous part of the memory allocated to the batch. In some embodiments, the metadata structure for integer data types corresponds to <offset, length>, where the offset corresponds to a location of the contiguous part of memory at which a first part of the data for a row is stored, and length corresponds to a length of the segment of the contiguous part of memory (e.g., extending from the offset) over which the data spans. In some embodiments, the metadata structure for an array data type corresponds to <child_idx, offset, length>, wherein child_idx corresponds to an identifier for the child array (or an index for the child array), the offset corresponds to a location of the applicable contiguous part of memory (e.g., a subset of the contiguous memory) at which a first part of the data for an array in a row of the batch is stored, and the length corresponds to a length of the segment of the contiguous part of memory (e.g., extending from the offset) over which the data for the array spans. In some embodiments, the data for each child array is stored (e.g., sequentially) in a contiguous part of the memory (e.g., a subset of the contiguous part of the memory allocated to the batch). The subsets of the contiguous part of the memory in which data for respective rows of the batch (e.g., respective child arrays) can be contiguous with one another or disjointed/distant (e.g., non-adjacent) with one another. The processing the rows for a batch to store the corresponding data in the contiguous part of the memory includes performing a transformation of a structure according to which data of the batch is arranged/stored (e.g., the initial structure of the data of the batch) to obtain the metadata structure according to which row data in the batch is to be stored contiguously.

In some embodiments, system 200 comprises memory allocation module 235. System 200 uses memory allocation module 235 to allocate a contiguous part of memory to a batch. For example, the contiguous part of memory allocated to a batch corresponds to a part of the memory in which resulting data (e.g., batch data that is processed for storage in the memory in accordance with the metadata structure) is stored. Memory allocation module 235 allocates memory for a batch based at least in part on one or more characteristics associated with the batch or the input data from which the batch is selected. For example, memory allocation module determines a size of the contiguous part of the memory to be allocated to a batch based on a size of the batch data or an expected size of the batch data.

In some embodiments, memory allocation module 235 allocates a contiguous part of the memory for processing a batch such as storing the data for the batch. Memory allocation module 235 can determine a size of the contiguous part of the memory based at least in part on a size of the batch data or of the input data to be evaluated. For example, memory allocation module 235 can estimate memory requirements (e.g., a size of data of the batch) for the batch. Memory allocation module 235 can use the query plan in connection with determining the memory requirements for the batch. In some embodiments, memory allocation module 235 determines the memory requirements based on the batching policy according to which the set of batches (e.g., comprising the batch for which memory is to be allocated) is determined. For example, memory allocation module 235 determines a size of the contiguous part of memory to be allocated to a batch based at least in part on a maximum batch size (e.g., a maximum file size, a maximum number of rows in the batch, etc.).

In some embodiments, system 200 (e.g., memory allocation module 235) determines whether row data comprises a child array(s). Memory allocation module 235 can determine the contiguous part of the memory to allocate to the batch based on the determination of whether row data in the batch comprises a child array(s). For example, memory allocation module 235 uses such a determination in connection with determining a size of the contiguous part of the memory to be allocated to a batch.

In some embodiments, system 200 comprises data processing module 237. System 200 uses data processing module 237 to process a selected batch to obtain resulting data that is stored in accordance with the applicable metadata structure. Data processing module 237 reads batch data from storage and writes resulting data to the allocated contiguous part of the memory in accordance with the metadata structure. For example, data processing module 237 sequentially reads rows comprised in the batch data and stores the row data sequentially in the allocated contiguous part of the memory.

In some embodiments, in response to obtaining the resulting data (e.g., data stored in the contiguous part of the memory) data processing module 237 evaluates the query against the resulting data. For example, data processing module 237 processes the query based on the resulting data. In connection with evaluating the query, data processing module 237 walks the contiguous part of memory allocated to the batch. For example, data processing module 237 walks sequentially through the contiguous part of the memory to obtain the corresponding resulting data and to determine the evaluated data (e.g., the processed resulting data).

In some embodiments, after evaluating the resulting data in the contiguous part of the memory based at least in part on the query, system 200 transforms the evaluated data based at least in part on the metadata structure. System 200 walks through the metadata structure (e.g., walk the contiguous part of the memory) and places (e.g., configures) the evaluated data back in the original format for the input data (or batch). For example, system 200 transforms the evaluated data to obtain query responsive data. The system can determine the transformation to perform with respect to the evaluated data stored in the contiguous part of the memory based at least in part on the metadata structure, such as based on a transformation that was performed with respect to the input data to obtain the metadata structure.

In some embodiments, system 200 comprises metadata structure transformation module 239. System 200 uses metadata structure transformation module 239 to perform the transformation of the evaluated data to the query responsive data.

In some embodiments, system 200 comprises data reading module 241. System 200 uses data reading module 241 to read the query responsive data (e.g., the evaluated data that has been transformed from the metadata structure to an original structure) and to provide a response to the query. Data reading module 241 can obtain the query responsive data and provide to a client system, or other system or service the query responsive data in response to the query. For example, data reading module 241 obtains the query responsive data and provides the query responsive data to user interface module 243 or communication module 225 for responding to the query.

In some embodiments, system 200 comprises user interface module 243. System 200 uses user interface module 243 to provide a user interface to a user (e.g., via a client system, etc.) via which the user configures, defines, develops, and/or queries data, data recipients to be provided access to such data, access permissions with respect to the data recipients and/or data, etc.

According to various embodiments, storage 215 comprises one or more of filesystem data 260, metadata 265. Storage 215 may further comprise Storage 215 comprises a shared storage (e.g., a network storage system) and/or database data, and/or user activity data.

In some embodiments, filesystem data 260 comprises a database such as one or more datasets for data entities (e.g., one or more datasets for one or more features, models, schemas, tables, etc.). Filesystem data 260 can comprise batch data obtained from a data store. For example, filesystem data 260 can include the resulting data obtained based on processing the batch data to store the batch data in accordance with the metadata structure (e.g., stored in a contiguous part of the memory). In some embodiments, filesystem data 260 comprises evaluated data that is obtained based at least in part on performing the query against the resulting data that is arranged in accordance with the metadata structure. Further, filesystem data 260 comprises query responsive data that is obtained based at least in part on transforming the evaluated data stored in accordance with the metadata structure to a structure/format of the input data from which the batch is selected for processing the query.

In some embodiments, metadata 265 comprises information pertaining to lineage of one or more data entities. For example, metadata 265 comprises a mapping of data elements (e.g., rows of batch data, an element of a child array, etc.) to locations in a memory such as a contiguous part of the memory allocated to the batch. Metadata 265 can be stored in accordance with the metadata structure used to arrange the batch data in the contiguous part of the memory. Metadata 265 can comprise metadata stored for the resulting data, evaluated data, and/or query responsive data.

According to various embodiments, memory 220 comprises executing application data 275. Executing application data 275 comprises data obtained or used in connection with executing an application such as an application executing in connection with managing data entities, an application executing to process jobs, an application that processes and/or responds to queries, an application that executes code being developed in a workspace, etc. In various embodiments, the application comprises one or more applications that perform one or more of receive and/or execute a query or command, generate a report and/or configure information that is responsive to an executed query or command, and/or to provide to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
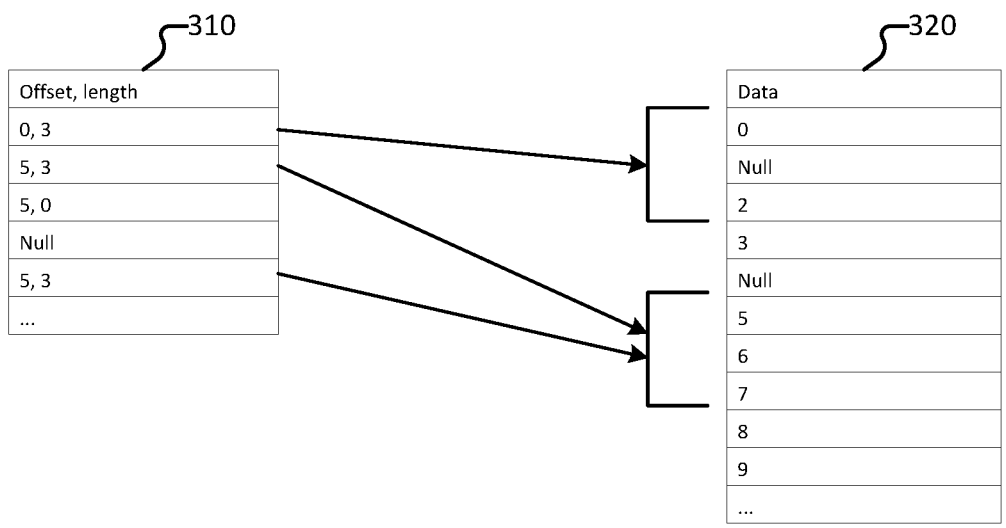
FIG. 3 is an illustration of a metadata structure according to various embodiments of the present application.

FIG. 3 is an illustration of a metadata structure according to various embodiments of the present application. In some embodiments, mapping 300 of metadata to data is implemented by system 100 (e.g., data processing service 110) of FIG. 1 and/or system 200 of FIG. 2.

In the example illustrated in FIG. 3, metadata 310 is mapped to memory 320. In some embodiments, memory 320 corresponds to a contiguous part of a memory that is allocated to a batch that is processed in connection with evaluating a query. Metadata 310 can indicate a location in memory 320 at which a particular data element is stored, such as row data for a row in batch data. In some embodiments, the metadata structure for integer data types can correspond to <offset, length>, where the offset corresponds to a location of the contiguous part of memory at which a first part of the data for a row is stored, and length corresponds to a length of the segment of the contiguous part of memory (e.g., extending from the offset) over which the data spans. Metadata 310 can be configured/arranged in accordance with the metadata structure to be used to process the batch (e.g., to store the batch data in memory for evaluation of the query).

Figure 4:
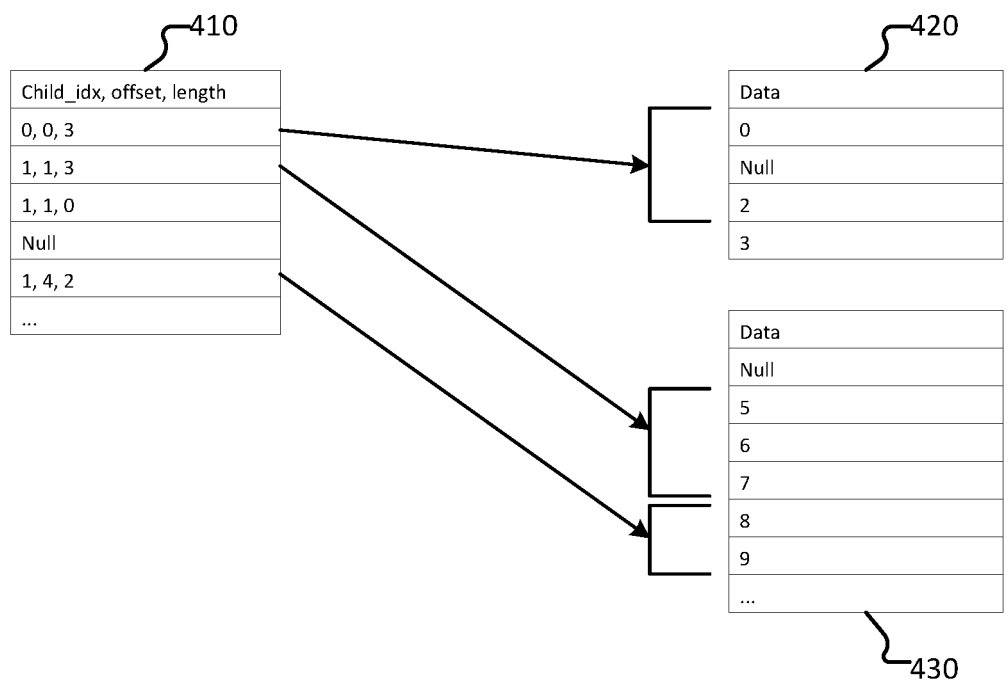
FIG. 4 is a flow diagram of a metadata structure according to various embodiments of the present application.

FIG. 4 is an illustration of a metadata structure according to various embodiments of the present application. In some embodiments, mapping 400 of metadata to data is implemented by system 100 (e.g., data processing service 110) of FIG. 1 and/or system 200 of FIG. 2.

In the example illustrated in FIG. 4, metadata 410 is mapped to one or more memories such as memory 420 or memory 430. In some embodiments, memory 420 and/or memory 430 corresponds to a contiguous part of a memory that is allocated to a batch, or part of a batch that is processed in connection with evaluating a query. In some embodiments, a contiguous part of the memory is allocated for each child array (or set of child arrays) in batch data (e.g., child arrays in a row of the batch data). For example, memory 420 can correspond to a part of the memory in which data for the child array having index identifier 0 is stored, and memory 430 can correspond to a part of the memory in which data for the child array having index identifier 1 is stored.

In some embodiments, data for a plurality of child arrays (e.g., all the child arrays) in a batch are stored in a contiguous part of the memory or are otherwise contiguous with one another. As an illustrative example, the part of storage corresponding to memory 420 can be contiguous with the part of storage corresponding to memory 430. Memory 420 and memory 430 can be contiguous subsets of the contiguous part of the memory allocated to a batch.

Metadata 410 can indicate a location in memory 420 or memory 430, etc., at which data elements for a child array are stored. Metadata 410 can be configured/arranged in accordance with the metadata structure to be used to process the batch (e.g., to store the batch data in memory for evaluation of the query).

In some embodiments, the metadata structure for an array data type can correspond to <child_idx, offset, length>, wherein child_idx corresponds to an identifier for the child array (or an index for the child array), the offset corresponds to a location of the applicable contiguous part of memory (e.g., a subset of the contiguous memory such as memory 420 or memory 430, etc.) at which a first part of the data for an array in a row of the batch is stored, and length corresponds to a length of the segment of the contiguous part of memory (e.g., extending from the offset) over which the data for the array spans. In some embodiments, the data for each child array is stored (e.g., sequentially) in a contiguous part of the memory (e.g., a subset of the contiguous part of the memory allocated to the batch). The subsets of the contiguous part of the memory in which data for respective rows of the batch (e.g., respective child arrays) can be contiguous with one another or disjointed/distant (e.g., nonadjacent) with one another.

In the example shown, 400 of FIG. 4 illustrates one or more contiguous parts of a memory for processing a batch. For example, 420 and 430 are two different contiguous parts of the memory. 420 and 430 each hold array elements for multiple entries from 410. Note that the last (1, 4, 2) points to array [8, 9] in 430 illustrating that two arrays from different rows are contiguously stored in a memory.

In some embodiments, the child index is optional for efficiency and/or performance. In some embodiments, the code is more efficient if there is only one child, since another layer of indirection is not needed while trying to process the array's elements (i.e., all the array elements are in a single buffer).

In some embodiments, without the child arrays, if there is an expression such as if (condition, array1, array2), there is a need to physically copy the elements desired from array1 and array2 into a single output. However, in the case with child arrays, the children can be adopted by updating the child index for each row. This makes the conditional expressions much more efficient during vectorized execution.

Figure 5:
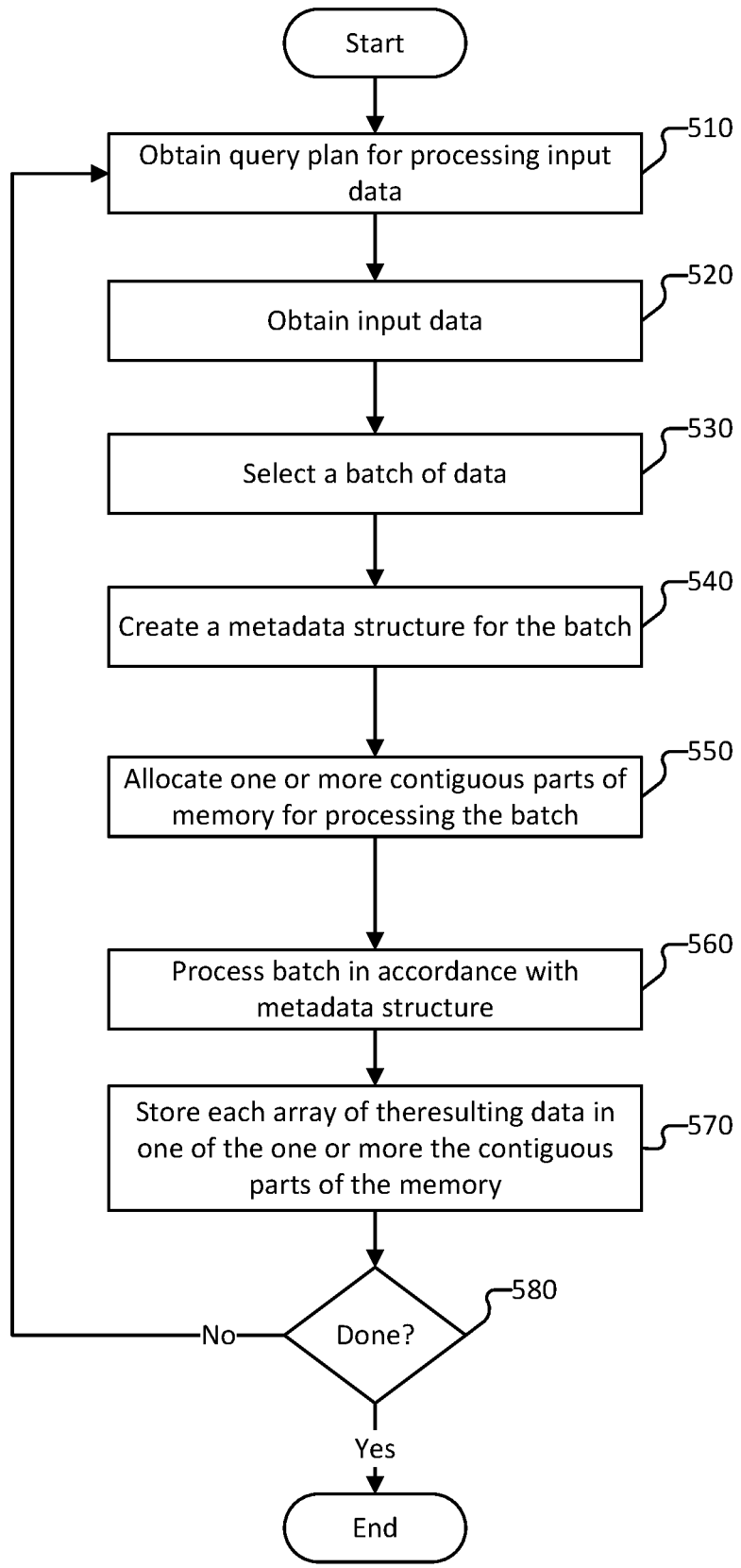
FIG. 5 is a flow diagram of a method for processing data according to various embodiments of the present application.

FIG. 5 is a flow diagram of a method for processing data according to various embodiments of the present application. Process 500 is implemented at least in part by system 100 of FIG. 1 and/or system 200 of FIG. 2.

At 510, a query plan for processing input data is obtained. The system determines the query plan in response to receiving a query such as from a client system, or another system or service (e.g., in connection with processing a job). The query can indicate data that is to be manipulated or otherwise evaluated, and the system determines a plan for performing the query with respect to such data.

At 520, input data is obtained. In some embodiments, the system obtains the input data based at least in part on the query plan. For example, the system determines a storage location of data that is to be manipulated or otherwise evaluated in connection with processing a query. The system can retrieve the input data from the storage location and store the data in a contiguous part of the memory in accordance with a metadata structure.

At 530, a batch of the input data is selected. In some embodiments, the size of the input data is too large for efficient processing of the data. The system can process the input data in chunks, and a batch can correspond to a chunk of the input data. In some embodiments, the system determines a set of batches corresponding to the input data and the system can perform processing of each batch on corresponding a set of one or more compute resources, or the system can serially process the set of compute resources.

At 540, a metadata structure is created for the batch. In response to determining to process a batch in connection with performing a query, the system determines a metadata structure according to which the batch is to be processed. The metadata structure can be configured such that the batch data is processed and stored in a contiguous part of a memory. For example, the metadata structure is configured to cause row data for sequential rows in the batch to be stored in sequential subsets of the contiguous part of the memory. In some embodiments, the system determines the metadata structure based on a determination of an efficient manner by which the batch is to be processed (e.g., a manner according to which the batch data is efficiently read and processed).

At 550, one or more contiguous parts of memory for processing the batch is/are allocated. In response to selecting the batch, the system determines a memory allocation in which batch data for the batch is to be stored in connection with performing/evaluating a query. The system can determine the memory allocation based at least in part on a size of the batch data or an expected size of the batch data. In some embodiments, the memory allocation corresponds to one or more contiguous parts of the memory.

At 560, the batch is processed in accordance with the metadata structure. In some embodiments, the system obtains batch data for the batch from a dataset (e.g., a dataset stored in a data store) and stores the batch data in the memory allocation (e.g., the contiguous part of the memory allocated to the selected batch). The processing of the batch includes determining locations in the contiguous part of the memory allocated to a batch at which the resulting memory is to be stored. In some embodiments, if a column of the table in the batch corresponds to an array data type, then the system can store the elements in an array for a row sequentially in a contiguous subset of the contiguous party of the memory in which the system stores the table data (or batch data).

At 570, each array of the resulting data is stored in one of the one or more contiguous parts of the memory. The system stores the resulting data in the contiguous part of the memory. The resulting data is stored in a manner that facilitates efficiency in reading the resulting data while evaluating the query.

At 580, a determination is made as to whether process 500 is complete. In some embodiments, process 500 is determined to be complete in response to a determination that no further input data is to be processed, no further queries are to be analyzed, a user has exited the system, an administrator indicates that process 500 is to be paused or stopped, etc. In response to a determination that process 500 is complete, process 500 ends. In response to a determination that process 500 is not complete, process 500 returns to 510.

Figure 6:
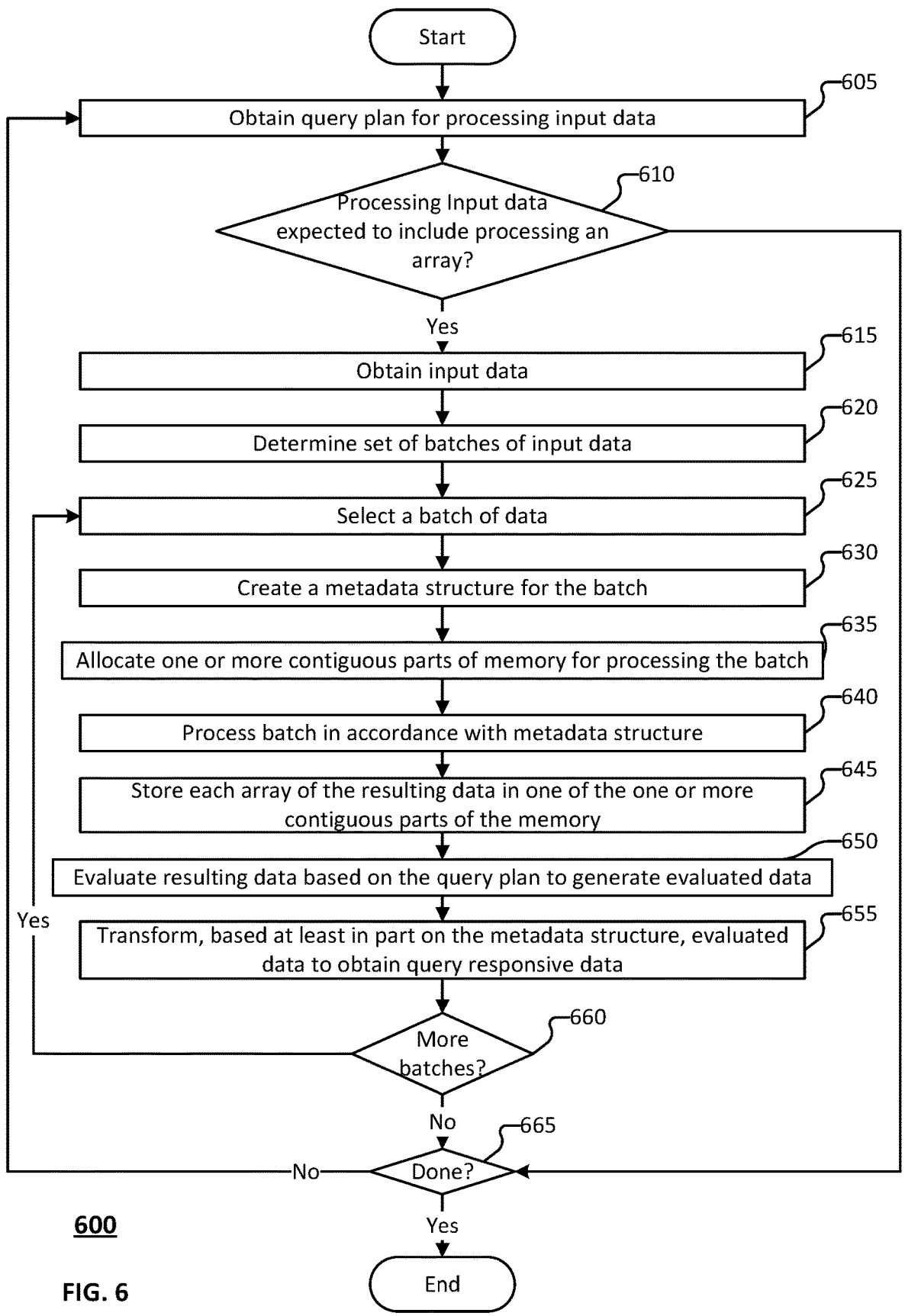
FIG. 6 is a flow diagram of a method for processing array data according to various embodiments of the present application.

FIG. 6 is a flow diagram of a method for processing array data according to various embodiments of the present application. Process 600 is implemented at least in part by system 100 of FIG. 1 and/or system 200 of FIG. 2.

At 605, a query plan for processing input data is obtained. In some embodiments, 605 corresponds to, or is similar to, 510 of process 500 of FIG. 5.

At 610, a determination of whether processing the input data is expected to include processing an array is performed. The system can determine that the input data is expected to include processing an array (e.g., a nested array) based on a determination of a data type of various columns in the input data (or the batch). For example, if a column of a batch that is to be processed to evaluate a query corresponds to an array type, the system determines that processing the input data is expected to include processing an array.

In response to determining that the input data is expected to include processing an array at 610, the system determines to implement the reading of the input data (e.g., in batches) to a memory in accordance with a predetermined metadata structure configured to enable efficient reading of the data during evaluation of the query. In response to determining that the input data is expected to include processing an array at 610, process 600 proceeds to 615.

Conversely, in response to determining that the input data is not expected to include processing an array at 610, process 600 proceeds to 665. For example, the system determines not to implement the reading of the input data to a memory in accordance with the predetermined metadata structure.

At 615, the input data is obtained. In some embodiments, 615 corresponds to, or is similar to, 520 of process 500 of FIG. 5.

At 620, a set of batches of the input data is determined. The system can process the input data in chunks, and a batch can correspond to a chunk of the input data. In some embodiments, the system determines a set of batches corresponding to the input data and the system can perform processing of each batch on corresponding a set of one or more compute resources, or the system can serially process the set of compute resources. In some embodiments, the system determines the set of batches based at least in part on a batching policy. The system can further determine the set of batches based at least in part on one or more characteristics of the input data such as a number of rows in a column to be processed, or a size of the input data.

At 625, a batch of data is selected. The system can select the batch from among set of batches.

At 630, a metadata structure is created for the batch. In some embodiments, 630 corresponds to, or is similar to, 540 of process 500 of FIG. 5.

At 635, one or more contiguous parts of memory is allocated for processing the batch. In some embodiments, 635 corresponds to, or is similar to, 550 of process 500 of FIG. 5.

At 640, the batch is processed in accordance with the metadata structure. In some embodiments, 615 corresponds to, or is similar to, 540 of process 500 of FIG. 5.

At 645, each array of the resulting data is stored in one of the or more contiguous parts of the memory. In some embodiments, 645 corresponds to, or is similar to, 570 of process 500 of FIG. 5.

At 650, resulting data is evaluated based at least in part on the query plan to generate evaluated data. In response to the system storing the resulting data in the applicable parts of the allocated one or more contiguous parts of the memory, the system processes the resulting data in accordance with the query to make the evaluated data.

At 655, evaluated data is transformed based at least in part on the metadata structure. The evaluated data is transformed to obtain query responsive data. After the batch has been processed in accordance with the query, the system transforms such data (e.g., the evaluated data) to a structure that is consistent with an original structure of the input data (e.g., a structure of the data before stored in accordance with the metadata structure).

At 660, a determination is made as to whether one or more other batches are to be processed. In response to determining that one or more batches are to be processed at 660, process 600 returns to 625 and process 600 iterates over 625-660 until no further batches remain to be processed. Conversely, in response to determining that no further batches remain to be processed at 660, process 600 proceeds to 665.

At 665, a determination is made as to whether process 600 is complete. In some embodiments, process 600 is determined to be complete in response to a determination that no further input data is to be processed, no further queries are to be analyzed, a user has exited the system, an administrator indicates that process 600 is to be paused or stopped, etc. In response to a determination that process 600 is complete, process 600 ends. In response to a determination that process 600 is not complete, process 600 returns to 605.

Figure 7:
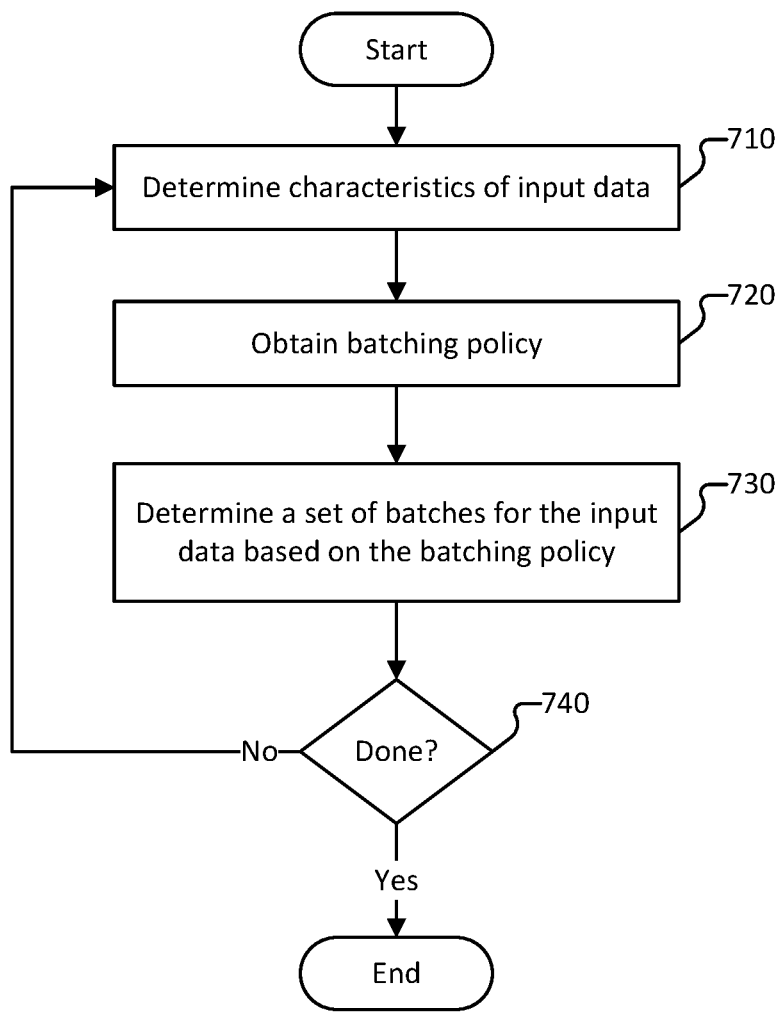
FIG. 7 is a flow diagram of a method for determining a set of batches for input data to be processed according to various embodiments of the present application.

FIG. 7 is a flow diagram of a method for determining a set of batches for input data to be processed according to various embodiments of the present application. Process 700 is implemented at least in part by system 100 of FIG. 1 and/or system 200 of FIG. 2.

In some embodiments, 620 of process 600 of FIG. 6 invokes process 700.

At 710, one or more characteristics of the input data are determined. Examples of the one or more characteristics includes a size or amount of data, one or more data types corresponding to columns in the input data, etc.

At 720, a batching policy is obtained. The batching policy can be stored in a dataset. For example, a set of batching policies can be configured in advance by an administrator, etc. The batching policy can be obtained based on the characteristics of the input data.

At 730, a set of batches for the input data is determined based at least in part on the batching policy.

The system can provide to the system or service that invoked process 600 an indication that the set of batches are determined.

At 740, a determination is made as to whether process 700 is complete. In some embodiments, process 700 is determined to be complete in response to a determination that no further input data is to be processed, no further queries are to be analyzed, a user has exited the system, an administrator indicates that process 700 is to be paused or stopped, etc. In response to a determination that process 700 is complete, process 700 ends. In response to a determination that process 700 is not complete, process 700 returns to 710.

Figure 8:
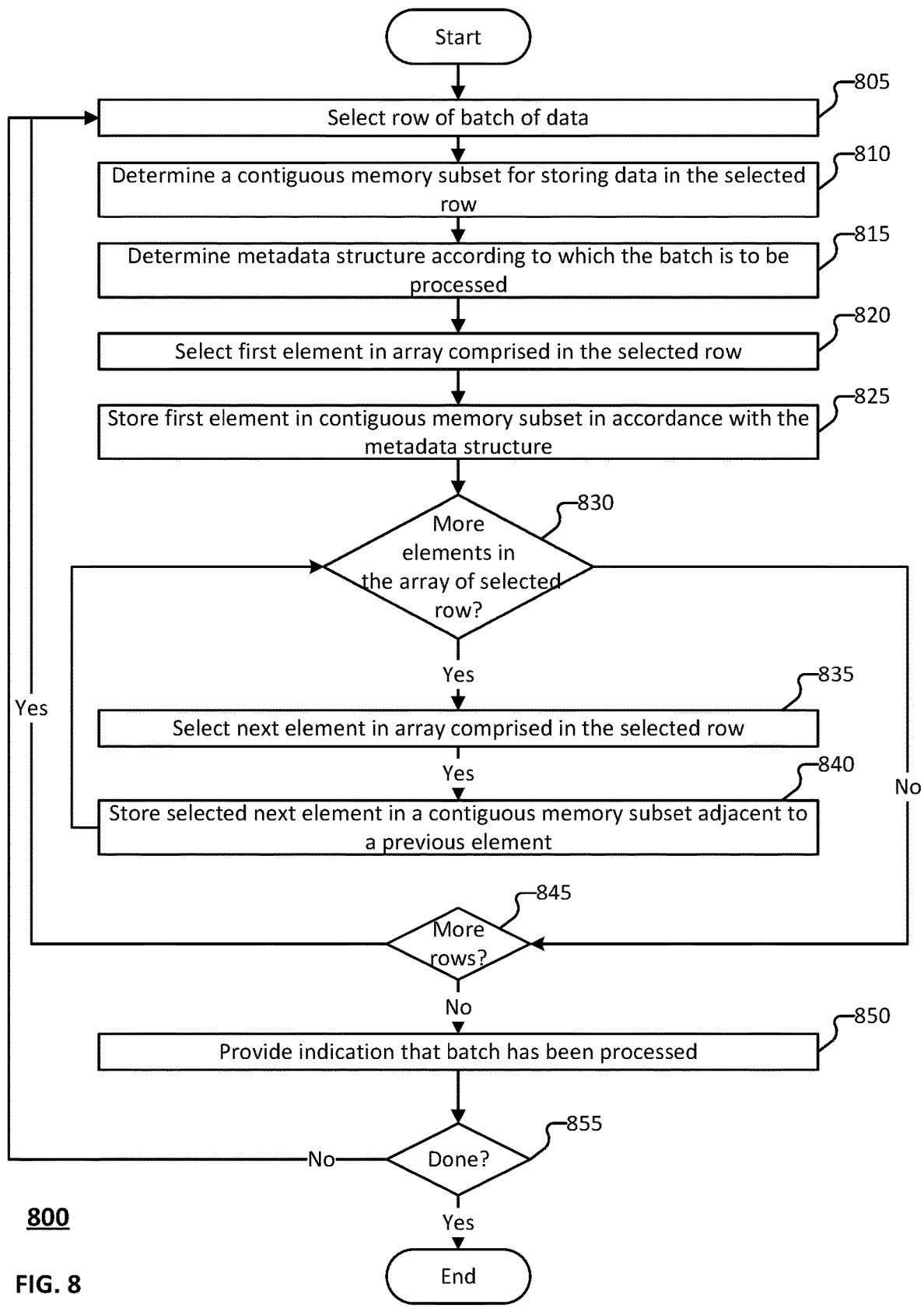
FIG. 8 is a flow diagram of a method for processing array data for one or more rows according to various embodiments of the present application.

FIG. 8 is a flow diagram of a method for processing array data for one or more rows according to various embodiments of the present application. Process 800 is implemented at least in part by system 100 of FIG. 1 and/or system 200 of FIG. 2.

At 805, a row of batch data is selected. In some embodiments, the data subject to a query is a column in a table of input data. Process 800 can iterate over 805-845 in connection with processing the rows in the batch. For example, the system performs 810-845 for each row in the batch in order to store the corresponding data in a contiguous part of the memory in accordance with a metadata structure.

At 810, a contiguous memory subset for storing data comprised in the selected row is determined. Each data element in a row in the batch can be stored in a corresponding contiguous memory subset (e.g., a subset of the contiguous part of memory allocated to the batch). The contiguous memory subset can be determined based at least in part on a size of row data and/or a data type for the row, etc. The system stores the various data elements included in an array of a row of the batch in sequential contiguous memory subsets. In some embodiments, a contiguous memory subset comprises one of the one or more contiguous parts of the memory.

At 815, a metadata structure according to which the batch is to be processed is determined. In some embodiments, 815 correspond to, or is similar to, 540 of process 500 of FIG. 5.

At 820, a first element in the array comprised in the selected row is selected.

At 825, the first element is stored in the contiguous memory subset corresponding to the selected row. The first element is stored in the contiguous memory subset in accordance with the metadata structure.

At 830, a determination is made as to whether the array of the selected row comprises additional elements to be processed. Process 800 can iterate over 830-840 for each other data element in the array of the selected row.

In response to determining that the array of the selected row comprises additional elements to be processed at 830, process 800 proceeds to 835 at which a next element in the array comprised in the selected row is selected.

At 840, a selected next element is stored in a contiguous memory subset adjacent to a previous element. In some embodiments, the system sequentially stores data elements in an array of a row in contiguous subsets of the allocated memory that are contiguous with one another. In connection with storing an element in the allocated memory in accordance with the metadata structure, the system can update the metadata for the element to indicate a location at which the element is stored in the allocated memory.

In response to determining that the array of the selected row does not comprise additional elements to be processed at 830, process 800 proceeds to 845 at which a determination is made as to whether the batch of data comprises one or more additional rows to be processed.

In response to determining that the batch of data comprises one or more additional rows to be processed at 840, process 800 returns to 805 and process 800 iterates over 805 to 845 until no additional rows in the batch of data are to be processed.

In response to determining that the batch of data does not comprise one or more additional rows to be processed at 840, process 800 proceeds to 850.

At 850, an indication that the batch of data has been processed is provided. The indication that the batch of data has been processed can be provided to another process, system, or service that invoked process 800 in connection with processing the batch of data.

At 855, a determination is made as to whether process 800 is complete. In some embodiments, process 800 is determined to be complete in response to a determination that no further input data is to be processed, no further queries are to be analyzed, a user has exited the system, an administrator indicates that process 800 is to be paused or stopped, etc. In response to a determination that process 800 is complete, process 800 ends. In response to a determination that process 800 is not complete, process 800 returns to 805.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory;
one or more processors configured to:
obtain a query plan for processing input data in response to a query;
obtain the input data;
select a batch of the input data, wherein the batch of the input data comprises a column of a plurality of rows, wherein the column corresponds to an array type such that one or more rows of the plurality of rows comprises an array in a column position for the row;
create a metadata structure for the batch, wherein the metadata structure includes a mapping of child data corresponding to a particular row being stored in a contiguous memory subset of one or more contiguous parts of memory;
allocate the one or more contiguous parts of the memory for processing the batch;
process the batch of the input data in accordance with the metadata structure to generate resulting data; and
store each array of the resulting data for the batch in one of the one or more contiguous parts of the memory.

2. The system of claim 1, wherein:
an element of the array type corresponds to an integer, a string, a struct, a map, a float, a decimal, or an array class type;
the metadata structure corresponds to a pointer from the batch of the input data to the resulting data; and
the resulting data for each row is stored sequentially in the contiguous part of the memory.

3. The system of claim 2, wherein the metadata structure corresponding to the resulting data comprises a<child_idx, offset, length> format.

4. The system of claim 2, wherein the metadata structure corresponding to the resulting data comprises an<offset, length> format.

5. The system of claim 1, wherein the child data for each element of an array in the particular row are sequentially stored in the contiguous memory subset.

6. The system of claim 5, wherein if the child data for a particular element of the array comprises a child array, then the child array elements are sequentially stored in the contiguous memory subset.

7. The system of claim 6, wherein the input data is stored in the one or more contiguous parts of the memory in an ordered manner based on an original configuration of rows of the input data, arrays comprised in the input rows, and child arrays comprised in the arrays for the input rows.

8. The system of claim 1, wherein the child data for each of the plurality of rows are stored sequentially in different contiguous memory subsets.

9. The system of claim 1, wherein the input data is stored in the one or more contiguous parts of the memory in an ordered manner based on an original configuration of rows of the input data, arrays comprised in the input rows, and child arrays comprised in the arrays for the input rows.

10. The system of claim 1, wherein the one or more processors are configured to:
determine a table of responsive data that is responsive to the query based at least in part on:
walking the one or more contiguous parts of the memory to obtain child data; and
generating the table based at least in part the child data.

11. The system of claim 1, wherein the one or more processors are further configured to:
process the resulting data based at least in part on the query plan to obtain processed resulting data; and
obtain query responsive data based at least in part on transforming the processed resulting data, wherein the transforming of the processed resulting data is based at least in part on the metadata structure.

12. The system of claim 1, wherein the one or more processors are further configured to:
transform the resulting data to obtain output data, the resulting data being transformed from the metadata structure to an original structure of the input data.

13. The system of claim 1, wherein the one or more processors are further configured to:
process the resulting data based at least in part on the query plan to obtain processed resulting data; and
obtain query responsive data based at least in part on transforming the processed resulting data, wherein the transforming of the processed resulting data is based at least in part on a schema for the input data.

14. The system of claim 1, wherein:
the one or more processors are further configured to:
determine a set of batches for the input data;
the batch of input data is selected from among the set of batches; and the set of batches are determined based at least in part on a batching policy.

15. The system of claim 14, wherein the set of batches are determined based at least in part on a predefined batching policy.

16. The system of claim 15, wherein the predefined batching policy indicates that batches are to be determined based on a number of rows or a size of data.

17. A method, comprising:
  obtaining a query plan for processing input data in response to a query;
  obtaining the input data;
  selecting a batch of the input data, wherein the batch of the input data comprises a column of a plurality of rows, wherein the column corresponds to an array type such that one or more rows of the plurality of rows comprises an array in a column position for the row;
  creating a metadata structure for the batch, wherein the metadata structure includes a mapping of child data corresponding to a particular row being stored in a contiguous memory subset of one or more contiguous part of memory;
  allocating the one or more contiguous parts of a memory for processing the batch;
  processing the batch of the input data in accordance with the metadata structure to generate resulting data; and
  storing each array of the resulting data for the batch in one of the one or more contiguous parts of the memory.

18. A computer program product embodied in a non-transitory computer readable medium and comprising computer instructions for:
  obtaining a query plan for processing input data in response to a query;
  obtaining the input data;
  selecting a batch of the input data, wherein the batch of the input data comprises a column of plurality of rows, wherein the column corresponds to an array type such that one or more rows of the plurality of rows comprises an array in a column position for the row;
  creating a metadata structure for the batch, wherein the metadata structure includes a mapping of child data corresponding to a particular row being stored in aa contiguous memory subset of one or more contiguous parts of memory;
  allocating the one or more contiguous parts of a memory for processing the batch;
  processing the batch of the input data in accordance with the metadata structure to generate resulting data; and
  storing each array of the resulting data for the batch in one of the one or more contiguous parts of the memory.

\* \* \* \* \*

UNITED STATES PATENT AND TRADEMARK OFFICE
CERTIFICATE OF CORRECTION

PATENT NO. : 12,332,875 B1
APPLICATION NO. : 17/884099
DATED : June 17, 2025
INVENTOR(S) : Palkar et al.

It is certified that error appears in the above-identified patent and that said Letters Patent is hereby corrected as shown below:

In the Claims

In Column 26, in Claim 18, Line 17, delete "in aa" and insert -- in a --, therefor.

Signed and Sealed this
Nineteenth Day of August, 2025

Coke Morgan Stewart
*Acting Director of the United States Patent and Trademark Office*